April 25, 1961      L. F. GINNETTE ET AL      2,981,629

PROCESS OF DEHYDRATING FOAMS

Filed April 5, 1960

L. F. GINNETTE, R. P. GRAHAM,
& A. I. MORGAN, JR.
INVENTORS

BY
ATTORNEY

2,981,629

PROCESS OF DEHYDRATING FOAMS

Lewis F. Ginnette, San Leandro, Robert P. Graham, El Cerrito, and Arthur I. Morgan, Jr., Berkeley, Calif., assignors to the United States of America as represented by the Secretary of Agriculture Filed Apr. 5, 1960, Ser. No. 20,229

13 Claims. (Cl. 99—206)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for dehydrating foams. A particular object of the invention is the provision of novel procedures whereby foams are converted into dehydrated, solid, porous products with an efficiency not heretofore attainable. Further objects and advantages of the invention will be apparent from the annexed drawing and the following description, wherein parts and percentages are by weight unless otherwise specified.

Figure 1:
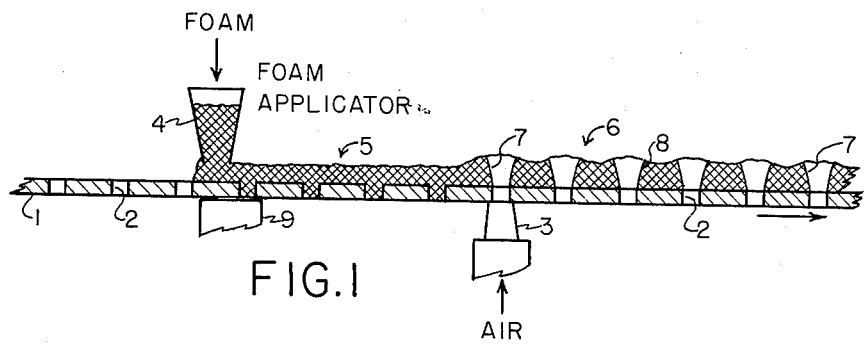
Figure 2:
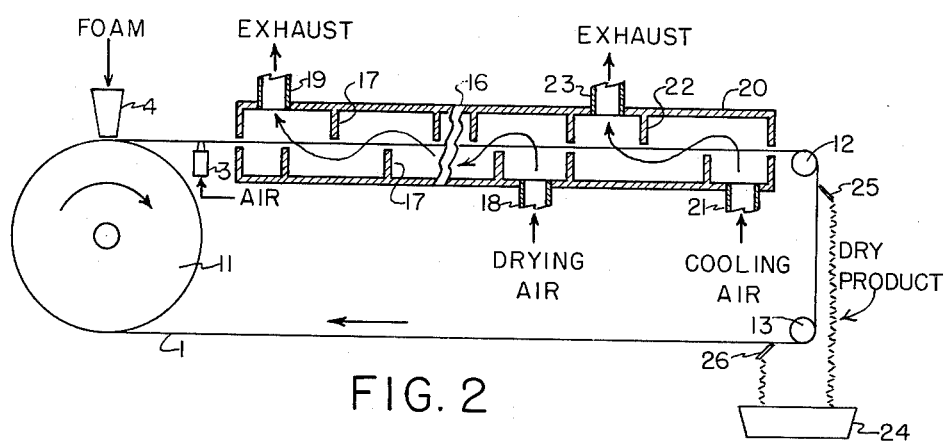
Figure 3:
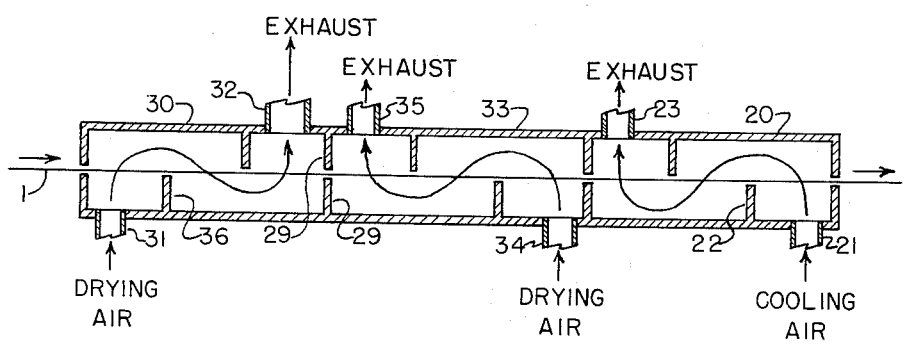

In the drawing, Figure 1 is a side-view, partly in cross-section, primarily depicting the perforation or cratering of a mat of foam. Figure 2 depicts schematically an embodiment of dehydration apparatus for utilizing the principles of the invention. Figure 3 is a partial view of a modification of the apparatus of Figure 2.

Primarily, the present invention concerns improvements in the method of dehydration generally known as "foam-mat" drying. In this method—disclosed and claimed, for example, in the copending application of Morgan, Randall, and Graham, Ser. No. 770,894, filed October 30, 1958, now Patent No. 2,967,109—a material to be dehydrated is first formed into a foam by incorporation of a gas and a foam-stabilizing agent. The resulting foam is then spread on a surface and contacted with a current of hot air to effect the dehydration. During the dehydration, the temperature of the air is controlled so that the foam essentially retains its original volume. Thereby the final product is in a very porous condition and hence rehydrates rapidly and completely when contacted with water for ultimate use. Moreover, preservation of the volume of the foam during dehydration makes the drying operation efficient because moisture can diffuse readily and rapidly out of the foamy mass. Also, under these conditions the dehydration is accomplished without substantial damage to color, flavor, nutrient value, or other vital attributes of the material even when the rate of drying is forced by application of high temperatures which would be totally ruinous to the same material in non-foamed condition.

In accordance with the present invention, dehydration efficiencies markedly superior to those attained in the aforesaid process are gained by a procedure which involves increasing the surface area of the foam in a novel manner. This is done by forming a mat of the foam to be dried and then impinging against the mat spaced jets of gas directed normal to the plane of the mat. Thereby the mat is perforated and its surface area is greatly increased. Consequently, when the perforated mat of foam is subjected to dehydration, elimination of moisture takes place more rapidly and with greater efficiency. In a preferred embodiment of the invention, the perforation is accomplished while the foam is on perforated support, as follows:

The foam to be dehydrated is spread onto a perforated surface, for example, a punched or drilled metal sheet. A blast of air or other gas is then directed through the perforations in said surface. This blast of air causes the portions of foam in and overlying the perforations to be moved away from the perforations toward imperforate sections of the surface. The net result is that the layer of foam is now perforated, the perforations in the sheet of foam corresponding with the perforations in the supporting surface. Because of the stiff nature of the foam, this new configuration is stable and is retained during subsequent treatment. The perforated foam is in prime condition for dehydration because its surface area has been multiplied many times. Depending on such factors as the depth of the mat of foam and the structure of the supporting surface, particularly the proportion of free space therein, the surface area may be multiplied anywhere from 5 to 25 times, or more. Having prepared this perforated sheet or mat of foam, it is subjected to dehydration in any desired manner. In a preferred modification of the invention, the perforated mat of foam is contacted with a current of hot air or other gas as in the known foam-mat method except that in the present case, the tremendous area of the foam permits dehydration in a fraction of the time required with a solid sheet of foam, or, with equal time of dehydration a much greater amount of foam can be dehydrated.

The action which occurs by application of the high-velocity gas blast to the mat of foam is further explained as follows, having reference to Figure 1 in the annexed drawing.

Referring to this figure, there is provided a sheet 1 of metal, or the like, having a series of perforations 2. (In the drawing, only a single row of perforations is shown to simplify the illustration. In practice, sheet 1 would be provided with staggered rows of perforations.) Sheet 1 provides a convenient surface on which the mat of foam is placed, perforated, and subsequently dehydrated.

The foam to be dehydrated is introduced into applicator 4 which extends across the width of sheet 1. As sheet 1 is traversed—in the direction shown by the arrow—beneath the applicator it is covered with a continuous, imperforate mat of foam, generally represented by 5. The troweling action of the bottom of applicator 4 also forces foam into the perforations, as evident in the drawing. Beneath sheet 1 is positioned a backing plate or doctor 9 extending across the width of the sheet. The bottom surface of sheet 1 is in sliding contact with the top surface of doctor 9 whereby the latter acts to avoid accumulation of any of the foam on the bottom of sheet 1.

Beneath sheet 1 is positioned a nozzle 3 which extends across the width of sheet 1. This nozzle provides an upwardly-directed current of air. As sheet 1 is traversed over the top of nozzle 3 the mat of foam is contacted with the air stream issuing from the nozzle. The portions of foam contained in and overlying perforations subjected to the air blast from the nozzle are thereby displaced upward and laterally from the axis of the air stream and the mat of foam is transformed into a perforated mat, generally designated as 6. It may be noted that after impingement of the air stream the mat of foam has perforations 7 corresponding with the perforations 2 in sheet 1. Since the perforations 7 have a generally conical shape with a mound 8 built up around each, the action which occurs is referred to herein as "cratering," in analogy to similar configuration in volcanic formations. It is particularly to be noted that contrary to what may be expected, the action of the air blast causes at most a very minor amount of spattering of the foam. Apparently because of its cohesive nature, the foam tends to move laterally away from the axis of the air stream rather than being projected upwardly away from the mat of foam. It is obvious that in a practice of the invention such variables as the size of the nozzle, the velocity of the air stream, the rate of traversal of sheet 1, etc., are so controlled as to attain a uniform cratering effect with a minimum of spattering. Suitable adjustments of the variables can be made when the procedure is applied in pilot trials observing the action of the air jet on the specific foam being handled.

Following formation of the perforated or cratered mat of foam, this material while in place on sheet 1 is subjected to dehydration as by applying a draft of heated air thereto.

The process of the invention is of wide applicability and can be utilized for the dehydration of foams of all types. Generally the foams are prepared by incorporating air or other gas into a liquid material which is to be dehydrated. Conventional foam-stabilizing agents are preferably added to ensure that the foam will be stable—that is, retain its perforated condition and its volume during dehydration. All kinds of materials may thus be dehydrated with utmost efficiency and economy, yielding products in a porous, readily rehydratable condition with substantial retention of flavor, color, nutritive value, and other vital attributes. Typical materials which may be dehydrated in accordance with the invention are set forth below merely by way of example and not limitation. These materials, when already of a liquid character, may be converted into foams directly or after suitable adjustment of texture and processed as herein described to yield the dehydrated products. Where the materials are of a solid nature they may be converted to liquid form by application of conventional techniques such as extraction with water, comminuting, pressing, cooking in water, steaming, or other known technique as may be applicable to the particular material in question.

Fruit and vegetable products: Juices, extracts, pulps, purees and similar products derived from fruits or vegetables such as orange, grapefruit, lemon, lime, apple, pear, apricot, strawberry, raspberry, pineapple, grape, prune, plum, peach, cherry, tomato, celery, carrot, spinach, lettuce, cabage, potato, sweetpotato, watercress, etc. The liquid products may be prepared in customary manner by subjecting edible portions of the produce to such operations as reaming, pressing, macerating crushing, comminuting, extracting with water, cooking, steaming, etc. These operations may be applied to the fresh produce or to processed produce, that is, produce which has been subjected to such operations as cooking, blanching, freezing, canning, sun-drying, sulphiting, or preservation by appliction of chemical preservatives or ionizing radiations.

Meat and fish products: Meat extracts, meat juices, soups or broths made from meat or fish products, clam juice, oyster stew, fish or clam chowders, etc.

Lacteal products: Whole milk, skim milk, whey, cream, buttermilk, yogurt, cheeses, milk products containing flavorings such as chocolate, cocoa, sugar, and the like, vitamin-fortified milk products, malted milk, etc.

Cereal products: Extracts of grains or slurries of finely divided cereal material made from wheat, barley, malted barley, rice, corn, etc.

Feed materials: Juices, extracts, purees, and other liquid products made from forages or feeds such as alfalfa, clover, grasses, cottonseed meal, soybean meal, corn stalks, hay, ensilage liquors, sugar cane, sugar beets, sorghum, fish meal, animal blood, bone meal, tankage, fish stick liquors, feather meal, meat scraps, fish heads, dairy, slaughterhouse or fishery wastes, etc.

Beverages: Aqueous extracts of coffee, tea, chocolate, yerba mate, roasted cereal products (simulated coffee products), etc.

Carbohydrate substances: Honey, maple syrup, corn syrup, sorghum syrup, malt syrup, molasses, syrups obtained from the saccharification of wood, cotton linters or other cellulosic materials. Dispersions—that is, true solutions, colloidal solutions, or suspensions—of sucrose, dextrose, invert sugar, fructose, maltose, lactose, dextrins, starches, natural gums as tragacanth, acacia, arabic, locust bean, karaya, carrageen, pectins, algins, low-methoxyl pectins, etc., synthetic gums such as methyl cellulose, carboxymethyl cellulose, carboxymethyl amylose, carboxymethyl anylopectin, etc.

Egg products: Egg white, egg yolk, whole egg, or preparations of egg with other foods such as milk or cream, custard or salad dressing preparations.

Industrial wastes: Liquid products derived from such materials as stick liquor, corn steep liquor, fruit cannery wastes, citrus peels and reaming residues, cull fruits and vegetables, tops of root vegetables, residues from fermentation operations such as broths, mashes, and distillers' slops.

Miscellaneous: Animal glues, muscilages from plant sources, starch pastes, solutions of bark extracts or other tanning agents, solutions of proteins or protein hydrolysates, solutions of sorbitol, mannitol, citric acid, tartaric acid, etc. Vitamin preparations such as solutions of ascorbic acid, thiamin or other vitamins, vitamin concentrates or vitamin precursors, fermentation products such as mushroom mycelium, yeast, microbialcultures, bacterial enzyme preparations, and biosynthesized compounds such as antibiotics, vitamins, etc.

The liquid preparation to which the process of the invention is applied need not be a true solution but may contain suspended matter entirely or in addition to dissolved matter. The invention is thus generically applicable to the dehydration of any liquid, this term being used in the sense of including any type of material which is capable of flowing.

In preparing a foam from the liquid to be dried it is required that the liquid have sufficient body to produce a stable foam. In most cases this requirement is met when the liquid contains so much suspended and/or dissolved solids that it has a thick consistency like that of a syrup, sauce, or paste. Thus, depending on the character of the liquid, it may be necessary to concentrate it by evaporation of water—or other conventional concentration technique—to increase its body. For example, ordinary juices such as orange juice and tomato juice are too thin to form stable foams. Accordingly, the juices are first concentrated to a level of at least about 20% or more, preferably to such an extent that they have a sauce-like or pasty consistency. Ordinary milk is another example of a substance which needs to be concentrated to build up its body prior to foaming it. In cases where the liquid is to be increased in body, this is generally accomplished by removal of water. However, other techniques can be used in place of, or in conjunction with, such techniques. For example, the consistency of juices, purees, and the like, can be increased by application of homogenization or colloid milling. Another plan is to add bodying agents such as dextrins, starch, pectin, algin, or other natural or synthetic gums. In the case of non-edible products, body can be increased by incorporation of minor amounts of finely-divided solids such as kaolin, bentonite, other types of clays, silica, hydrated forms of silica, silicic acid, diatomaceous earths, etc., or water-soluble inorganic bodying agents such as sodium silicate. On the other hand, such materials as molasses, honey, corn syrup, starch pastes, and the like, already have sufficient body that no increase in solids content is needed. Moreover, some materials may require dilution with water to give them proper liquid characteristics. For example, in applying the process to such relatively high-solids materials as pulped raisins, dates, figs, mashed cooked potatoes, or the like, it is generally necessary to add some water to the pulp so that it will flow more readily and will be adaptable to incorporation of a gas to form a foam. It will be evident to those skilled in the art from the above explanation that in any specific instance the liquid to be dehydrated is to be adjusted to a thick, more or less pasty consistency by conventional techniques so that it will be amenable to forming a stable foam.

In preparing the foam, a gas is incorporated into the liquid by conventional techniques. Although air is generally used as the gas it is by no means essential to use it and any gas may be employed. In preparing edible products, non-toxic gases are used such as air, nitrogen, carbon dioxide, nitrous oxide, helium, propane, n-butane, isobutane, dichlorodifluoromethane, trichloromonofluoromethane, or monochlorotrifluoromethane. Incorporation of the gas into the liquid may be accomplished in any of the conventional methods used, for example, in aerating ice cream, salad dressings, etc. A simple method where air is to be incorporated is to whip the liquid with a rotating wire whip which beats air into the mixture. For best results it is preferred that the gas bubbles be dispersed uniformly throughout the foam and be of uniformly small size, i.e., about 100 microns or less in diameter. Such techniques as homogenizing may be employed to increase uniformity and decrease the size of the gas bubbles. Also, the mixture may be cooled during the foaming operation to promote formation of a stable foam. Where cooling is used, any temperature below room temperature may be applied provided it is not low enough to freeze the foam. The amount of gas incorporated into the liquid may be varied widely. Generally it is preferred to incorporate enough gas to increase the volume of the liquid 1.5 times, more preferably about 2 to 3 times. It is evident that the greater the volume increase the more bulky will be the final product because of a greater proportion of volume of voids to total volume. In some cases it may not be desired to produce a too-bulky end product (because of increased packaging costs) and in such case, the volume increase may be limited, say, to not over 5 times. However, if bulk of the final product is not a consideration, the volume increase may be as much as desired, up to, say, 10 or 20 times original volume of the liquid. It is evident from the above that the volume increase achieved in forming is not a critical item and may be varied as desired under particular circumstances.

In many instances it is not feasible to form a stable foam merely by incorporation of a gas into the liquid. Accordingly, it is preferred to add to the liquid before or during foaming, a minor proportion of a foam-stabilizing agent. The chemical nature of the foam-stabilizing agent is of no moment to the operability of the invention as long as the agent possesses the ability to stabilize foams. Various examples of suitable agents are listed hereinafter. The proportion of foam-stabilizing agent will vary depending on the properties of the liquid, the properties of the agent in question etc. In general, the proportion of the agent may vary about from 0.1 to 5.0%, by weight based on the weight of solids in the liquid. It is naturally desirable to use the lowest proportion of foam-stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

The foam stabilizer may be a surface active agent or a hydrophilic colloid or a mixture of the two.

Typical examples of classes of surface active agents and individual compounds which may be used are listed below:

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R—CO—(OC_2H_4)_n—OH$$

where R—CO is the acyl radical of a fat acid such as lauric, palmitic, oleic, stearic, etc. and $n$ has a value from 6 to 60.

Condensation products of ethylene oxide with long-chain aliphatic alcohols, i.e., compounds of the formula $$R—(OC_2H_4)_n—OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl ($C_8$—$C_{20}$) benzene sulphonates. Typical in this class are sodium dodecyl benzene sulphonate and sodium hexadecyl benzene sulphonate.

Alkyl esters of sulphosuccinic acid, for example, the sodium salt of dioctyl sulphosuccinate.

Sulphonated or sulphated fatty acid esters or amides, i.e., compounds of the types:

$$RCO—O—CH_2—CH_2—SO_3Na$$

$$RCO—NH—CH_2—CH_2SO_3Na$$

$$RCO—O—CH_2—CH_2—OSO_3Na, \text{ and}$$

$$RCO—NH—CH_2—CH_2—OSO_3Na$$

wherein RCO— represents the acyl radical of a long-chain fatty acid such as lauric, myristic, palmitic, stearic, oleic, etc.

Condensates of ethylene oxide and alkyl phenols, that is, compounds of the type, $R—C_6H_4—(OC_2H_4)_n\ OH$ wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hyodesoxycholic acid, dehydrodesoxycholic acid, dehydrohyodesoxycholic acid, lithocholic acid, glycocholic acid, or taurocholic acid.

It will of course be appreciated that the particular surface active agent for use in the process of the invention will be selected according to the use which is to be made of the final product. Thus, where the product is intended for edible purposes, the surface active agent selected will be one which is edible or at least which may be ingested without adverse effects. Thus, for the production of edible products, we prefer to use surface active agents of the class of fatty acid esters of sorbitan or mannitan, agents of the class of polyoxyethylene sorbitan (or mannitan) fatty acid esters, agents of the class of polyoxyethylene derivatives of higher fatty acids, e.g., polyoxyethylene monostearate, agents of the class of sucrose mono- or di-esters with higher fatty acids, agents of the class of glycerol monoesters of higher fatty acid esters, agents of the class of bile salts, etc.

Generally it is preferred to employ surface active agents in order to stabilize the foam for dehydration since these agents are especially effective even when employed in very small proportion, for example, from 0.1 to 2% by weight based on the weight of solids in the liquid. However, the foam stabilizer may be a mixture of a surface active agent and a hydrophillic colloid or may be a hydrophillic colloid alone.

Typical examples of hydrophillic colloids which may be employed are: albumin, dried egg-white, dried glucose-free egg-white, gelatin, sodium gluten sulphate, sodium gluten phosphate, polyvinylpyrrolidone, polyvinyl alcohol, soluble starch, sodium carboxymethyl cellulose, methyl cellulose, agar, gum tragacanth, gum arabic, gum acacia, gum karaya, carragheen, alginic acid, sodium alginate, pectin, dextran, dextrin, sodium carboxymethyl starch, sodium carboxymethyl amylose, sodium carboxymethyl amylopectin, pentosans, etc. Generally it is preferred to employ as the hydrophillic colloid, water-dispersible proteins such as albumin, dried-egg white preparations, or the like.

Having prepared a foam as above described, the foam is spread as a mat on a perforated surface. The thickness of the mat may be varied. Generally, mats about from 0.01 to 0.50 inch are used and give good results. Thicker layers can be used with advantage, particularly where the relative volume of gas in the foam is high. In applying the foam onto the perforated sheet, the applicator means may be one that deposits the foam only onto the top surface of the sheet. Usually, however, it is preferred that the mat of foam extend into the perforations of the sheet as shown in Figure 1. This has the benefit that when the mat is cratered, the mounds about the individual craters are especially high whereby the surface of the cratered mat is especially uneven, hence offers a large surface area to the dehydrating medium.

As the perforated surface, various structures can be used. A preferred structure is the ordinary perforated sheet metal of commerce which is provided with circular apertures in staggered rows. Good results are obtained with such structures having holes from about 1/16" to about 1/2" in diameter spaced on centers to provide an open area of anywhere from 20 to 60% of the total area of the sheet. The maximum hole size is limited for any particular case so that the foam plug inside the hole does not flow out of the sheet before cratering. It is obviously desirable that the perforations—as is the case with commercial perforated sheet—be uniformly disposed over the area of the support. This contributes to providing the mat of foam with uniform spacing of perforations or craters so that diffusion of moisture will occur at essentially uniform rates from all areas of the mat. For maximum increase in total surface area by perforation of the mat of foam, it is preferred that the support have as much open area as possible consistent with retention of sufficient strength in the sheet to make it usable. With supports having circular apertures, the maximum open area is generally around 60%. However, greater open areas with maintenance of structural strength can be provided with supports having square, rectangular, or triangular apertures.

After perforating or cratering the mat of foam, this mat is subjected to dehydration. Various methods and equipment can be employed for dehydrating the mat. For example, the mat may be subjected to vacuum. During application of vacuum, heat may be applied, for example, by radiant heaters which radiate heat directly onto the mat or by heating means such as steam-heated platens, radiant heaters or the like applied to the support bearing the mat. As with other dehydration techniques disclosed below, the amount of heat applied is limited to avoid any substantial reduction in the volume of the foam, thus to ensure production of a porous end product and also to avoid softening of the foam to the extent that it might sag into the perforations and plug them. Although vacuum dehydration may be used it is not preferred because of the expense of the equipment and the high cost of maintaining the vacuum. Thus we prefer to conduct the dehydration by applying a hot gas to the mat under normal (atmospheric) pressure. Generally air is used as the gaseous medium for this dehydration but it is by no means essential to use it. Thus, if desired, oxygen-free gases may be employed to avoid any possibility of oxidation of the product. In such event one may use inert gases such as nitrogen; carbon dioxide; helium; or combustion gases resulting from the burning coal, coke, petroleum oils or more preferably, natural gas.

In conducting the dehydration by application of a heated gas one may use, for example, conventional cabinet driers wherein the perforated trays bearing the mat of foam are subjected to a current of hot gaseous medium. Continuous dehydrators of various types may be used, for example, driers equipped with mechanical drive arrangements to move a supporting means—individual perforated trays or a continuous perforated belt—bearing the perforated mat of foam through the apparatus while it is contacted with hot gas. For best results it is preferred that the current of hot gas be propelled, at least for part of the dehydration, transversely through the perforations in the mat. Such movement of the hot gas may be supplemented with currents moving in concurrent, countercurrent or crosswise directions. A preferred plan is to use a structural arrangement that provides transverse gas flow applied concurrently, so that the hottest, driest gas contacts the incoming portions of foam in the first stage of drying and as the gas becomes cooler and moister it is applied to the outgoing portions of the foam in the last stage of drying. Also, the drier apparatus may be compartmentalized to permit application of gas streams at different temperature levels to different sections of the mat of foam. Such technique may be desired in drying heat-sensitive materials to avoid overheating the material as it becomes dry and as the cooling effect of evaporation is diminished. A preferred form of apparatus for applying transverse-countercurrent gas flow is shown in Figure 2. A modification of this apparatus wherein the dehydrating chamber is compartmentalized to permit a compound (concurrent and counter) flow system is schematically depicted in Figure 3.

Generally, the temperature of the gaseous medium may range from about 100 to 300° F. Within this range the temperature may be varied in individual cases depending on such factors as the properties of the material being dried, the throughput, the rate of drying desired, and so forth. Generally it is desired to employ as high a temperature as possible to achieve a rapid rate of dehydration. However, the temperature should not be so high as to overheat the product or cause the foam to decrease substantially in volume. By preserving the volume of the foam during drying one is assured of producing a porous, readily rehydratable product. Also, during the drying the foam should not be overheated to the extent of causing it to sag into and plug the perforations. To ensure such a result the foam layer may be kept under observation during dehydration and the temperature of the gas reduced if the foam shows a tendency to decrease in volume or sag to an undesired extent. It is impossible to set forth numerical temperature limits in this connection because the stability of the foam will depend on many factors including efficacy of the foam stabilizing agent, temperature of the foam, moisture content of the foam, size of gas bubbles in the foam, rate of heating of the foam, softening temperature of the product, etc. However, in any particular instance the gas temperature may be controlled in accordance with visual observation and this system of control affords a more reliable guide than could numerical limits.

After carrying out the dehydration as described above there is produced a solid dehydrated product having essentially the same volume as the foam and in a porous, spongy form. The product will generally have a moisture content of about 10% or less as may be controlled by variation of the factors in the dehydration such as time and temperature. Generally it is preferred to cool the dehydrated product before removing it from the tray, belt, or other structure on which it was dehydrated. The cooling may be effected by contacting the product with a current of cool, preferably cool and dry, air or other gas as exemplified above. Generally, the dehydrated product is cooled to approximately room temperature and in such form is brittle and may be readily removed from the surface on which it is located. The product may then be readily broken up into flakes or particles for packaging or use.

Ordinarily the cratered mat of foam is dehydrated completely while resting on the perforated sheet on which it was first placed. This procedure is, however, by no means the only method which can be used. Generally the foam after cratering and in the early stage of the dehydration is in a condition in which it might be damaged if it were removed from the surface. That is, it would tend to tear apart. However, after the dehydration has progressed the mat attains a plastic condition and becomes self-supporting. At this stage the partly-dried mat can be peeled from the supporting sheet and further dehydrated independently. For example, the peeled mat can be cut into sections and hung in a drier cabinet or can even be fed continuously in festoon arrangement through a drier in the same manner as continuous webs of paper, textiles, linoleum, etc. are dried. Completing the drying in this manner has the advantage that the rate of dehydration is expedited as hot air may be applied from all directions and there is no barrier to rapid diffusion of moisture out of the mat. The process as outlined above is especially applicable where the material to be dried contains such substances as carbohydrates or proteins which act as bonding agents and, in effect, tie together the solids content of the mat into a self-sustaining structure.

Hereinabove, in explaining the foaming operation the matter of bulkiness of the product has been mentioned. It was noted that the greater the proportion of gas incorporated into the material to be dried, the more bulky will be the product. In some cases it is desirable to take advantage of a high proportion of gas in the foam to promote evaporation while avoiding too much bulkiness in the product. This end can be attained by conducting at least part of the dehydration under conditions at which the volume of the foam is retained and then at or near the end of the dehydration period, applying a current of especially hot gas to collapse the foam to a desired extent. As an example, the liquid to be dried may be originally puffed to five times its volume by incorporation of a gas, then dehydrated under conditions whereby this volume is retained. Then the foam is subjected to brief contact with a current of hot air or radiant heat from an electric heating unit to collapse it to say about half its volume. As an alternative, this controlled collapse of the dehydrated product may be achieved while the foam is still hot and plastic (i.e., before application of the cooling step) by pressing the foam with rollers, platens, or similar pressing means.

The process of the invention is further explained in connection with Figure 2 which illustrates an embodiment of apparatus for continuous dehydration of foams in accordance with the invention.

The apparatus includes a flexible perforated belt 1 made of stainless steel, neoprene, Teflon-coated glass fibers or other suitable sheet material, disposed about drum 11 and rollers 12 and 13. Drum 11 is driven by conventional mechanism to continuously traverse belt 1 in the direction indicated in the figure.

The foam to be dehydrated is fed into applicator 4 for application to belt 1. Typical formulations of the foam are given below by way of illustration but not limitation:

(A) To 100 parts of tomato juice concentrate containing 30% solids is added 0.24 part sucrose dipalmitate dissolved in warm diethyl ether, then air whipped in to produce a foam having a density of 0.4 gram/ml.

(B) To 100 parts of commercial corn syrup (75% solids) is added one part of dried egg albumin and then air whipped in to produce a foam having a density of about 0.4 gram/ml.

(C) To 100 parts of cane molasses (75% solids) is added one part of glycerol monostearate dissolved in warm ethyl alcohol and then air whipped in to produce a foam having a density of about 0.4 gram/ml.

(D) Potatoes are peeled, quartered, and cooked in a steam-air mixture (190° F.) for one hour. The cooked potatoes are then pressed through a 10-mesh screen and mixed with half their weight of water. This results in a thick paste containing about 15% solids. To 20 parts of this potato paste at 180° F. is added one part of glycerol monostearate. The mixture is stirred violently for one minute, then cooled to room temperature. The mixture is then mixed into 180 parts of the potato paste at room temperature. The resulting mixture is then whipped to beat air therein, forming a foam having a density of 0.45 gram/ml.

(E) One hundred parts of whole milk concentrate (40% solids) is heated to 160° F. and to it is added 0.6 part of a commercial glyceride containing 90% of monoglycerides of fully-hydrogenated lard fatty acids. The mixture is agitated in a blender for one minute to uniformly disperse the monoglyceride in the milk concentrate. The mixture is then cooled to 40° F. and whipped with a power-operated egg beater, rotated at about 700 r.p.m. for five minutes. A stable foam of specific gravity 0.3 is produced.

(F) To 100 parts of tomato paste (30% solids) is added 0.45 part of dried egg albumen and the mixture is whipped to beat air therein, forming a foam having a volume of 2.5 times that of the original concentrate.

(G) To 100 parts of an aqueous coffee extract (30% solids) is added 0.06 part of sucrose dipalmitate dissolved in warm diethyl ether. The mixture is whipped with a power-operated egg beater for five minutes to produce a foam having a density of 0.2 gram/ml.

(H) To one part of glycerol monostearate is added 10 parts of 170° F. water and the mixture is violently mixed. After cooling the mixture to 120° F. it is added to 300 parts of tomato paste containing 30% solids. This mixture is pumped through a mechanical mixer together with an appropriate quantity of nitrogen gas. The result is a foam having a density of 0.4 gram/ml.

Applicator 4 may be provided with conventional means such as an adjustable roller or gate whereby the foam is coated onto the belt in a predetermined thickness, generally in the range from about 0.01 to 0.5 inch thick.

The continuous drum or other surface below the sheet at the foam applicator prevent the foam from flowing through the sheet perforations.

As belt 1 is traversed, the mat of foam thereon is contacted by a jet of air issuing from nozzle 3 whereby the mat is perforated or cratered as previously described.

The continued movement of belt 1 carries the perforated mat of foam through the dehydration chamber generally designated as 16. This is essentially a box-like arrangement including baffles 17, hot air inlet 18, and exhaust air outlet 19. As the perforated foam is carried through compartment 16, it is contacted with the hot air and dehydrated. Baffles 17 direct the air stream in the sinuous path shown by the arrows so that the air stream repeatedly flows through the perforations 7 (see Figure 1) to cause rapid dehydration of the foam.

It is, of course, evident that the length of dehydrating chamber 16 is adequate to permit the perforated mat of foam to be dehydrated in the time of its passage through it. Also, chamber 16 is not sealed from the atmosphere and the pressure therein is essentially normal (atmospheric) pressure.

The temperature of the hot air passing through chamber 16 is controlled at a high enough level to effectuate a rapid elimination of moisture from the foam yet not so high as to cause any substantial reduction in the volume thereof. Preservation of the volume of the foam during dehydration means that formation of a final product in porous condition is ensured. Also, the foam should not be heated the extent that it will sag or run into the perforations. The air temperature may be controlled in accordance with visual observation of the material undergoing dehydration, and, for this purpose chamber 16 may be provided with windows, sight glasses, or the like.

Moreover, although it is generally preferred to achieve the dehydration primarily by contact of the foam with heated air, it is within the purview of the invention to employ supplementary heating means within chamber 16. Thus, for example, radiant heaters may be provided to heat the foam as it is being dehydrated and radiant or conductive-type heaters may be provided to heat the belt 1 and so indirectly to heat the mat of foam thereon. Moreover, heating means such as finned steam pipes may be disposed within chamber 16 to reheat the current of air as it is cooled by contact with the moist foam.

After leaving dehydrating chamber 16, the dehydrated product is next transported by belt 1 to cooling chamber 20 which is constructed essentially the same as chamber 16. An inlet port 21 is provided for the introduction of cool air. Air of low humidity is preferably employed to prevent moisture re-gain by the product. Baffles 22 direct the cooling air through the perforations in the mat of foam. Exhaust air is vented through conduit 23. Chamber 20 is not sealed from the atmosphere and the pressure therein is essentially normal or atmospheric pressure. Generally the dehydrated product is cooled to a temperature of 100° F. or below, usually to about room temperature. This puts the product in a brittle state so it can be readily dislodged from belt 10.

The cool, dehydrated product is then carried by belt 1 about rollers 12 and 13. These rollers are deliberately of a small size so that the belt is subjected to a sudden change in direction with the result that the product— now in a brittle condition—is cracked and dislodged from the belt as its traverses rollers 12 and 13. The product now in the form of fragments falls into receiver 24. Doctor blades 25 and 26, spaced a small distance from the surface of belt 1, assist in freeing the loosened particles of product. The product collected in hopper 24 may be directly crumbled into small fragments or compressed to reduce its bulk prior to crumbling or other form of subdivision.

Referring to Figure 3, there is depicted therein a dehydrating system providing for concurrent air flow in the first part of the dehydration and countercurrent flow in the latter part of the dehydration. This system is of advantage to force the rate of dehydration by applying especially hot air to the incoming foam when its moisture content is high; hence, danger of overheating is remote. A lesser air temperature can be applied in the latter stage where the evaporative cooling effect is lower. Also, the air temperatures and directions of flow may be varied from this pattern to suit individual circumstances. Thus the functions of the air inlets and outlets may be reversed and/or the relative temperatures in the two sections may be reversed. In this apparatus the dehydrating chamber is divided into two sections by barriers 29. The first section 30 for concurrent flow is provided with hot air inlet 31 and exhaust vent 32 and the second section 33 is provided with hot air inlet 34 and exhaust vent 35. Baffles 36 are provided as in the modification of Figure 2 for directing the air stream transversely through the perforations in the belt 1 and in the mat of foam.

The invention is additionally demonstrated by the following illustrative examples.

*Example I*

(A) One part of glyceryl monostearate is blended with nine parts of water at 160° F. The resulting emulsion is added to 300 parts of tomato paste (30% solids) at room temperature. This mixture is whipped to a stiff foam with nitrogen gas by passing it through a continuous mechanical foamer. Density of the foam is about 0.4 gram/ml.

(B) The foam is spread in a layer $\frac{1}{16}$" thick on one side and in the holes of a stainless steel perforated sheet. This sheet is provided with staggered rows of circular holes $\frac{3}{16}$" in diameter on $\frac{5}{16}$" centers; thickness of the sheet is about $\frac{1}{16}$". The loaded sheet is then passed over an air manifold provided with a slot $\frac{1}{16}$" wide. Air is directed upwardly through this slot at a velocity of about 150 ft. per second. The layer of foam is thus perforated or cratered as above described. It is estimated that the surface area of the mat of foam is increased about five times by the cratering operation.

(C) The sheet bearing the cratered mat of foam is then placed in a cabinet drier where it is subjected to a draft of air moving normal to the plane of the sheet. The air has a temperature of 160° F., relative humidity of 5%, and velocity of 5 ft. per second. After 8 minutes the sheet is removed from the drier. The product (containing 2% moisture) can be readily removed from the sheet by gentle scraping. None of the product has accumulated in the perforations of the sheet.

The product on spoon-stirring with cold water formed in a minute a reconstituted tomato paste indistinguishable from the original paste.

In control experiments wherein imperforate layers of the tomato paste foam ($\frac{1}{16}$" thick) were exposed to the same drying conditions, drying times of 40–45 minutes were required.

*Example II*

The process as described in Example I is repeated except that in this case 150 parts of orange juice concentrate (60% solids) is substituted for the tomato paste. A sample of the product added to cold water and stirred with a spoon for less than a minute formed a reconstituted orange juice indistinguishable in taste and texture from that prepared from the original concentrate.

*Example III*

Tomato paste is foamed and formed into a perforated mat as described in Example I, parts (A) and (B).

The sheets bearing the perforated or cratered foam are placed in a cabinet drier wherein they are subjected to a draft through the perforations. The air is initially at 180° F. and 5% relative humidity and is periodically changed over a 6-minute drying time to a final condition of 130° F. and 30% relative humidity. This experiment duplicates conditions in a continuous through-flow drier employing concurrent air and product movement. The product containing 5% moisture, and still on the sheets, was removed from the moist air. It was then dried to 2% moisture in a stream of dry air at 120° F. A portion of the product on spoon-stirring with cold water for one minute formed a reconstituted tomato paste indistinguishable from the original paste.

Having thus described the invention, what is claimed is:

1. A method of dehydrating a foam which comprises applying a mat of foam onto a perforated surface, forcing a gas through the perforations in said surface at a velocity sufficient to cause the portions of the mat in and overlying the perforations to be displaced, producing a perforated mat of foam and dehydrating the said perforated mat of foam.

2. The method of claim 1, wherein the said perforated mat of foam is at least partly dehydrated while in place on said perforated surface.

3. The method of claim 1, wherein the said perforated mat of foam during dehydration is maintained in a perforated condition.

4. A method of dehydrating a foam which comprises establishing a mat of foam, impinging against said mat spaced jets of gas, each jet being directed essentially normal to the plane of the mat, thereby to perforate the mat and increase its surface area, and dehydrating said mat while maintaining it in said perforated state.

5. In the method wherein a mat of foam is dehydrated under conditions to maintain the mat in essentially its original volume, the improvement which comprises increasing the surface area of the mat prior to dehydration by impinging against the mat spaced jets of gas, each jet being directed essentially normal to the plane of the mat, thus to perforate the mat and increase its surface area.

6. A method of dehydrating a foam which comprises applying a mat of foam on a perforated surface, forcing a gas through the perforations in said surface to cause the portions of the mat in and overlying the perforations to be displaced thereby producing a perforated mat of foam, and applying a heated gas to the perforated mat until the dehydration is completed.

7. A method of dehydrating a foam which comprises applying a mat of foam onto a perforated surface, forcing a gas upwardly through the perforations in said surface to cause the portions of the mat in and overlying the perforations to be displaced upward and laterally to clear the perforations thereby producing a perforated mat of foam, and applying a heated gas to the perforated mat until the dehydration is completed.

8. The method of claim 7 wherein at least part of the dehydration is carried out by directing the heated gas through the perforations in the perforated mat.

9. The method of claim 7 wherein the foam contains edible material.

10. The method of dehydrating an edible material which comprises providing edible material in the form of a foam, applying a mat of the foam on a perforated surface, forcing a gas through the perforations in the surface to cause portions of the mat in and overlying the perforations to be displaced upward and laterally, producing a perforated mat of foam, and applying a heated gas to the perforated mat until the dehydration is completed, the temperature of the heated gas being limited to avoid substantial reduction in the volume of the foam.

11. The method of dehydrating a food which comprises providing a food in the form of a foam, applying the foam onto a perforated support to form a mat of foam thereon, directing spaced jets of gas through the perforations in said support against the mat, the jets being directed essentially normal to the plane of the mat, thereby to perforate the mat and increase its surface area, applying a drying gas and heat to said mat to dehydrate it, the amount of heat applied being sufficient to cause rapid evaporation of moisture from the mat but insufficient to cause any substantial sagging of the foam and plugging of the perforations in the mat.

12. The method of dehydrating a foam which comprises providing a mat of foam, puncturing the mat at a plurality of points spaced uniformly over the area of the mat by directing spaced jets of gas against the mat, and dehydrating the mat while maintaining it in said punctured condition.

13. The method of dehydrating a food which comprises providing a food in the form of a foam, applying the foam onto a support provided with perforations spaced uniformly over essentially its entire area, directing jets of gas through the said perforations whereby to perforate the mat in a configuration essentially corresponding with that of the support, applying a drying gas and heat to said mat to dehydrate it, the amount of heat applied being sufficient to cause rapid evaporation of moisture from the mat but insufficient to cause any substantial reduction in the perforate area of said mat.

No references cited.